UNITED STATES PATENT OFFICE.

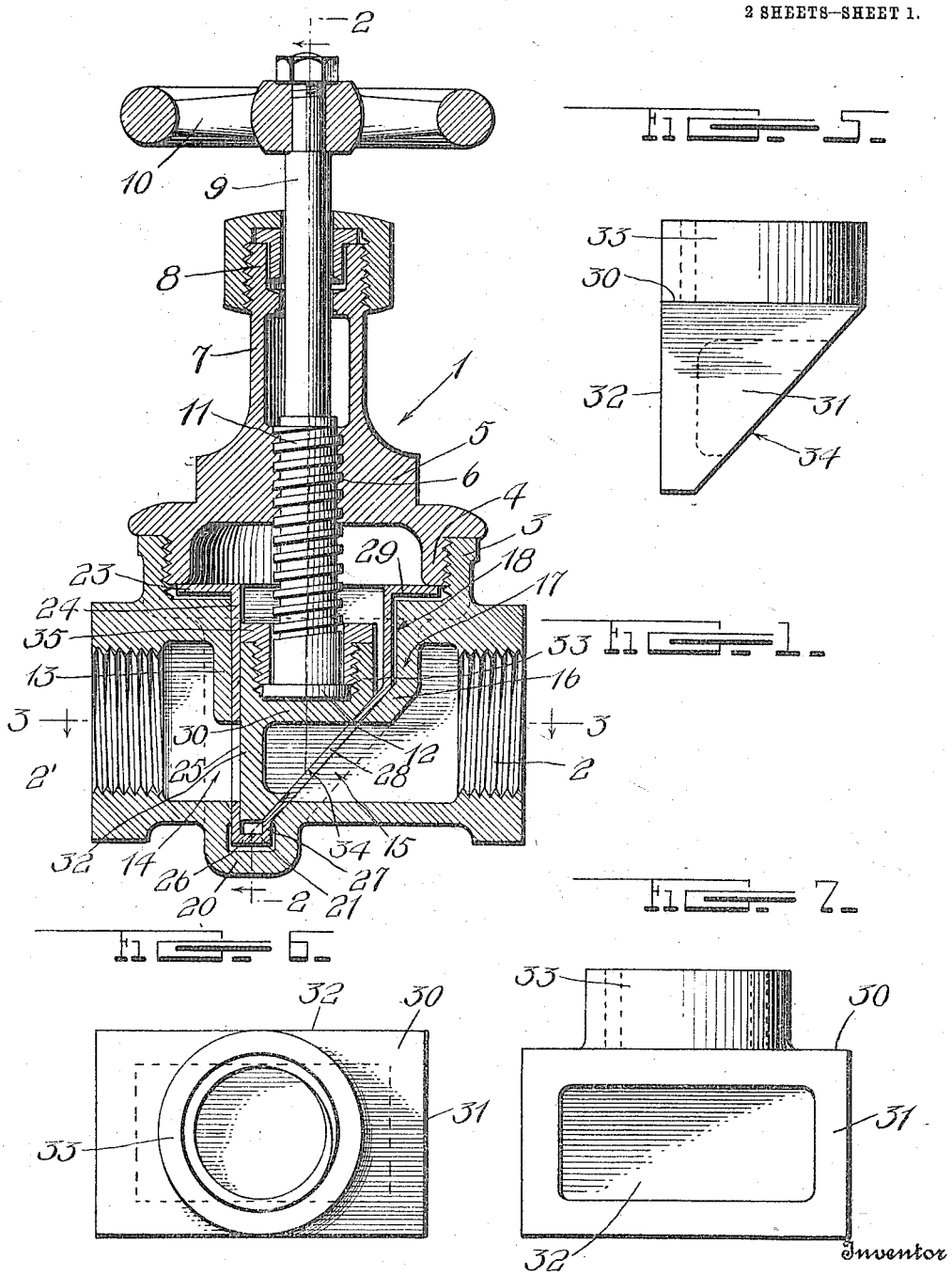

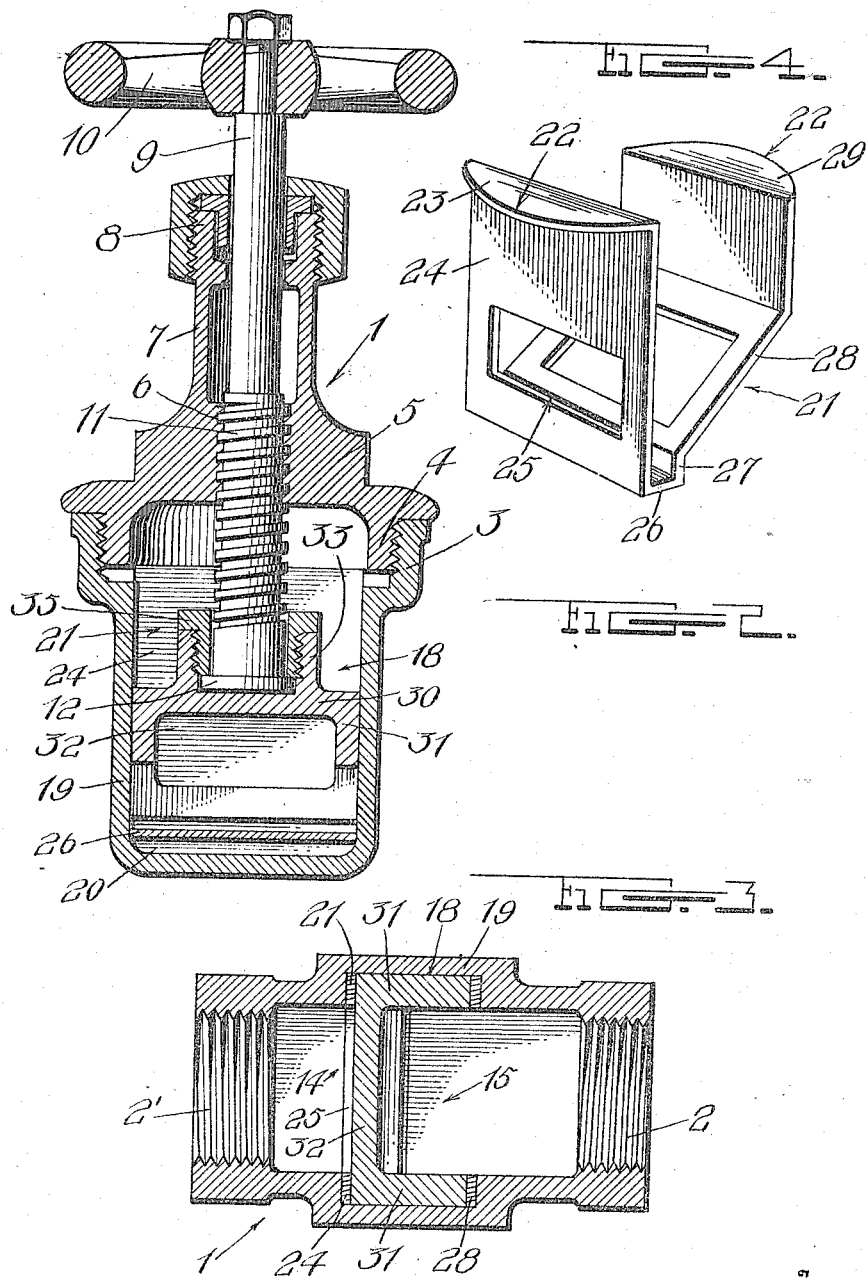

DAVID HAMILTON, OF GREENSBURG, PENNSYLVANIA.

GATE-VALVE.

1,135,280.   Specification of Letters Patent.   Patented Apr. 13, 1915.

Application filed September 10, 1914. Serial No. 861,099.

*To all whom it may concern:*

Be it known that I, DAVID HAMILTON, a citizen of the United States, residing at Greensburg, in the county of Westmoreland and State of Pennsylvania, have invented certain new and useful Improvements in Gate-Valves; and I do declare the following to be a full, clear, and exact description of the invention, such as will enable others skilled in the art to which it appertains to make and use the same.

My invention relates to improvements in valves and more particularly to those employing a vertically movable gate.

The main object of the invention is to provide an extremely simple construction which will be highly efficient in operation and which will be well adapted to the purpose for which it is designed.

A further object of the invention is to provide a removable valve seat preferably formed of non-corrosive material whereby leakage around the gate or valve proper may be prevented should the valve casing corrode.

Yet another object is to construct the removable valve seat of a single sheet metal plate and to secure the same in position by the attachment of a hood or bonnet through which the valve stem is threaded.

With the above and minor objects in view, the invention resides in certain novel features of construction and combination, herein described and claimed and shown in the drawings wherein:

Figure 1 is a vertical section through a valve constructed in accordance with my invention; Fig. 2 is a view taken at right angles to Fig. 1 as seen on the line 2—2 of said figure; Fig. 3 is a horizontal section as seen on the line 3—3 of Fig. 1; Fig. 4 is a perspective view of the removable valve seat; Fig. 5 is an edge view of the gate or valve proper; Fig. 6 is a top plan view thereof; and Fig. 7 is a rear view.

In the accompanying illustration, I have shown my invention as comprising a substantially cylindrical casing 1 having threaded openings 2 and 2' in its opposite ends, said casing being likewise provided with an upright annular flange 3, on its top, said flange being internally threaded for the reception of a circular flange 4 which depends from a hood or bonnet 5, the latter being provided with a coarsely threaded bore 6.

Rising from the member 5 is a sleeve 7 whose upper end carries a stuffing box 8 which receives therein a cylindrical valve stem 9 having an operating wheel 10 on its upper end, the intermediate portion of the stem 9 being provided with screw threads 11 interengaging the threads in the bore 6, while the extreme lower end of said stem is provided with an annular external shoulder 12. The valve stem coacts with other parts of the device in a manner to be set forth.

Disposed transversely within the casing 1 and located adjacent the opening 2', is an upright transverse partition 13 whose lower portion is provided with an opening 14, while spaced inwardly from the partition 13 and having an opening 15 alining with the opening 14, is an inclined transverse partition 16 which diverges upwardly from the said partition 13 and is integrally connected at its upper end with a comparatively short upright wall 17 which lies parallel to the upper end of said partition 13.

By reference to the various figures of the drawings, it will be seen that the casing 1 is provided with a rectangular opening 18 in its upper side, said opening registering with the space beneath the bonnet 5. It will likewise be seen that the intermediate portions of the casing 1, at its opposite sides and bottom, are enlarged as indicated respectively at 19 and 20.

Projecting through the opening 18 and positioned in the space between the partitions 13 and 16, is a removable valve seat 21 which is here shown as formed of a single metal plate having its opposite ends rounded as indicated at 22, one of said ends, designated by the numeral 23, lying in a horizontal plane and projecting laterally from an upright portion 24 of said plate, said portion contacting with the inner side of the partition 13 and having an opening 25 alining with the opening 14. The lower end of the portion 24 is bent laterally inward as seen at 26, said laterally bent portion lying within the enlargement 20 and having its free end continued upwardly as at 27 and then diverging upwardly from the portion 24 as seen at 28, said portion 28 contacting with the inner side of the inclined partition 16 and having an opening alining with the opening 15 therein. From the top of the portion 28 the remaining end of the plate continues vertically in substantial contact with the wall 17 and is then bent laterally outward as seen at 29, said laterally bent portion lying in the same horizontal plane with the portion 23.

When the parts are assembled, the entire removable valve seat is positioned in the casing through the opening 18 and its laterally bent ends 23 and 29 are located within the flange 3 and forced normally downward by the depending flange 4 which is formed on the bonnet 5. By this construction it will be seen that the valve seat is normally held in operative position but that the same may be readily removed when necessary. The seat may be formed of any suitable material but is preferably constructed of non-corrosive metal.

Coacting with the removable valve seat, is a substantially wedge shaped valve most clearly seen in Figs. 5, 6 and 7, said valve comprising a flat top plate 30, side plates 31 depending therefrom, a front plate 32 likewise depending from said top plate and lying in an upright plane and a hollow internally threaded boss 33 which rises from the plate 30, the various parts of said valve being preferably cast as a single unit and formed of non-corrosive material. By reference to the various figures of the drawings, it will be seen that the edges of the side plates 31, opposite the upright plate 32, incline as indicated at 34 and that said inclined edges contact with the inclined portion of the removable valve seat when the valve is positioned as seen in Fig. 1, in which position the upright front plate 32 contacts with the upright wall of said removable seat and the boss 33 receives the lower headed end of the stem 9, said end being preferably secured within said boss by a suitably constructed nut 35.

With the parts as above described, it will be readily seen that rotation of the wheel 10 in a counter-clockwise direction will unseat the valve thus allowing fluid to flow into the opening 2, through the alined openings in the two partitions and in the removable valve seat, said fluid being then discharged through the opening 2'. On the other hand, it will be seen that the rotation of the wheel 10 in a clockwise direction will force the valve downwardly into contact with its seat thus preventing the passage of fluid through the casing.

By constructing the various parts as above set forth, it will be seen that an extremely simple valve is provided, yet one whose efficiency will not be impaired by corrosion of the interior of the casing. It will be further noted that the removable valve seat may be replaced when the same becomes worn thereby greatly increasing the life of the entire valve structure.

Having thus described my invention, what I claim is:

1. The combination with a valve casing having an opening in one side, an annular internally threaded flange surrounding said opening, and a pair of partitions within the casing, said partitions being located on opposite sides of the opening and converging toward the opposite side of the casing, a nut having a threaded engagement with the internally threaded annular flange, and a valve located between said partitions; of a removable valve seat interposed between the valve and the partitions, said valve seat being formed of a single plate bent substantially upon itself to form a pair of converging plates, said plates contacting with the converging partitions and having their free ends passed through the opening in the casing and bent laterally, said laterally bent ends contacting with the inner side of the nut, the converging plates and the converging partitions having alined openings.

2. The combination with a valve casing having an opening in one side, an annular internally threaded flange surrounding said opening, a valve in the casing, and a nut having a threaded engagement with said flange, of a removable valve seat in said casing and having a retaining member projecting through said opening and bearing against the inner ends of the nut.

In testimony whereof I have hereunto set my hand in presence of two subscribing witnesses.

DAVID HAMILTON.

Witnesses:
J. Q. TRUXAL,
JACOB TRUXAL.